US012472522B2

(12) United States Patent
Nagatomo et al.

(10) Patent No.: US 12,472,522 B2
(45) Date of Patent: Nov. 18, 2025

(54) WASTE LIQUID SCATTERING PREVENTION DEVICE AND WASTE LIQUID SCATTERING PREVENTION METHOD

(71) Applicant: HONDA MOTOR CO., LTD., Tokyo (JP)

(72) Inventors: Yuta Nagatomo, Tokyo (JP); Wataru Nogita, Tokyo (JP); Yuichi Oda, Tokyo (JP); Kimihide Tabata, Tokyo (JP); Takeshi Nabeta, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 365 days.

(21) Appl. No.: 18/127,028

(22) Filed: Mar. 28, 2023

(65) Prior Publication Data

US 2023/0311148 A1 Oct. 5, 2023

(30) Foreign Application Priority Data

Mar. 30, 2022 (CN) ......................... 202210329088.6

(51) Int. Cl.

| | |
|---|---|
| ***B05B 14/30*** | (2018.01) |
| ***B05B 14/10*** | (2018.01) |
| ***B05B 15/555*** | (2018.01) |
| ***B08B 3/02*** | (2006.01) |

(52) U.S. Cl.
CPC .............. *B05B 14/30* (2018.02); *B05B 14/10* (2018.02); *B05B 15/555* (2018.02); *B08B 3/02* (2013.01)

(58) Field of Classification Search
CPC ......... B05B 14/30; B05B 15/555; B08B 3/02; B08B 3/028; B08B 14/10
See application file for complete search history.

(56) References Cited

U.S. PATENT DOCUMENTS 5,693,150 A * 12/1997 Powell ...................... B08B 3/02 134/102.1

FOREIGN PATENT DOCUMENTS

| | | |
|---|---|---|
| JP | 2014-223566 | 12/2014 |
| JP | 2015-077557 | 4/2015 |

OTHER PUBLICATIONS

Japanese Office Action for Japanese Patent Application No. 2023-032542 dated Aug. 20, 2024.

* cited by examiner

*Primary Examiner* — Andrew A Horton
(74) *Attorney, Agent, or Firm* — Amin, Turocy & Watson, LLP

(57) ABSTRACT

A waste liquid scattering prevention device includes a box body having an upper wall being formed with an insertion hole into which a tip portion of a paint gun is inserted, and an air ejection port that ejects air along an inner wall of the box body. A waste liquid scattering prevention method includes an arrangement step of inserting the tip portion of a paint gun into an insertion hole, a cleaning step of cleaning the paint gun, and an air ejecting step of ejecting air from an air ejection port along the inner wall of the box body.

9 Claims, 2 Drawing Sheets

WASTE LIQUID SCATTERING PREVENTION DEVICE AND WASTE LIQUID SCATTERING PREVENTION METHOD

CROSS-REFERENCE TO RELATED APPLICATIONS

This application is based upon and claims the benefit of priority from Chinese Patent Application No. 202210329088.6 filed on Mar. 30, 2022, the contents of which are incorporated herein by reference.

BACKGROUND OF THE INVENTION

Field of the Invention

The present invention relates to a waste liquid scattering prevention device and a waste liquid scattering prevention method for preventing waste liquid from scattering during cleaning or test spraying of a paint gun (coating material gun) equipped with a bell-shaped spray head.

Description of the Related Art

A rotary atomizing painting device equipped with a paint gun having a bell type spray head (bell cup) is often used when a workpiece is painted with paint (coating material) in a painting booth or the like. In the rotary atomizing painting device, the paint atomized by the centrifugal force generated when the bell cup of the paint gun rotates is sprayed onto the workpiece with shaping air.

When the painting color applied to the workpiece is changed, in order to prevent color mixing between the paint before the change and the paint after the change, the paint remaining in the paint gun is washed with a cleaning liquid such as thinner. In order to reuse the cleaning liquid having been used for cleaning, the waste liquid containing the cleaning liquid is recovered using a waste liquid recovery device (see, for example, JP 2014-223566 A).

Inside the waste liquid recovery device, the waste liquid containing the cleaning liquid and the paint is atomized. When the atomized waste liquid rebounds and scatters, the atomized waste liquid reattaches to the paint gun. In order to suppress the scattering of the atomized waste liquid due to rebounding, the waste liquid recovery device disclosed in JP 2014-223566 A is provided with a cylindrical cover member that surrounds, during cleaning, a shaping air discharge portion provided to a paint gun.

SUMMARY OF THE INVENTION

It is desired that the above-described conventional technique is improved to effectively suppress the scattering of the atomized waste liquid due to rebounding without providing a cover member.

An object of the present invention is to solve the above-described problems.

A first aspect of the present invention is a waste liquid scattering prevention device that prevents scattering of waste liquid when a paint gun including a bell-shaped spray head is cleaned or tested, the device including a box body that includes an upper wall being formed with an insertion hole into which a tip portion of the paint gun is inserted, and an air ejection port that ejects air along an inner wall of the box body.

A second aspect of the present invention is a waste liquid scattering prevention method when the paint gun including the bell-shaped spray head is cleaned or tested, the method including an arrangement step of inserting a tip portion of the paint gun into an insertion hole formed in an upper wall of a box body, a cleaning step of cleaning the paint gun, and an air ejecting step of ejecting air from the air ejection port along the inner wall of the box body.

According to the present invention, since the air ejected along the inner wall of the box body prevents the waste liquid atomized in the box body from colliding with the inner wall of the box body, it is possible to suppress re-adhesion of the waste liquid to the paint gun caused by the rebounding on the inner wall of the box body. Further, because the air ejected along the inner wall of the box suppresses the rising of the atomized waste liquid, it is possible to suppress re-adhesion of the atomized waste liquid to the paint gun.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
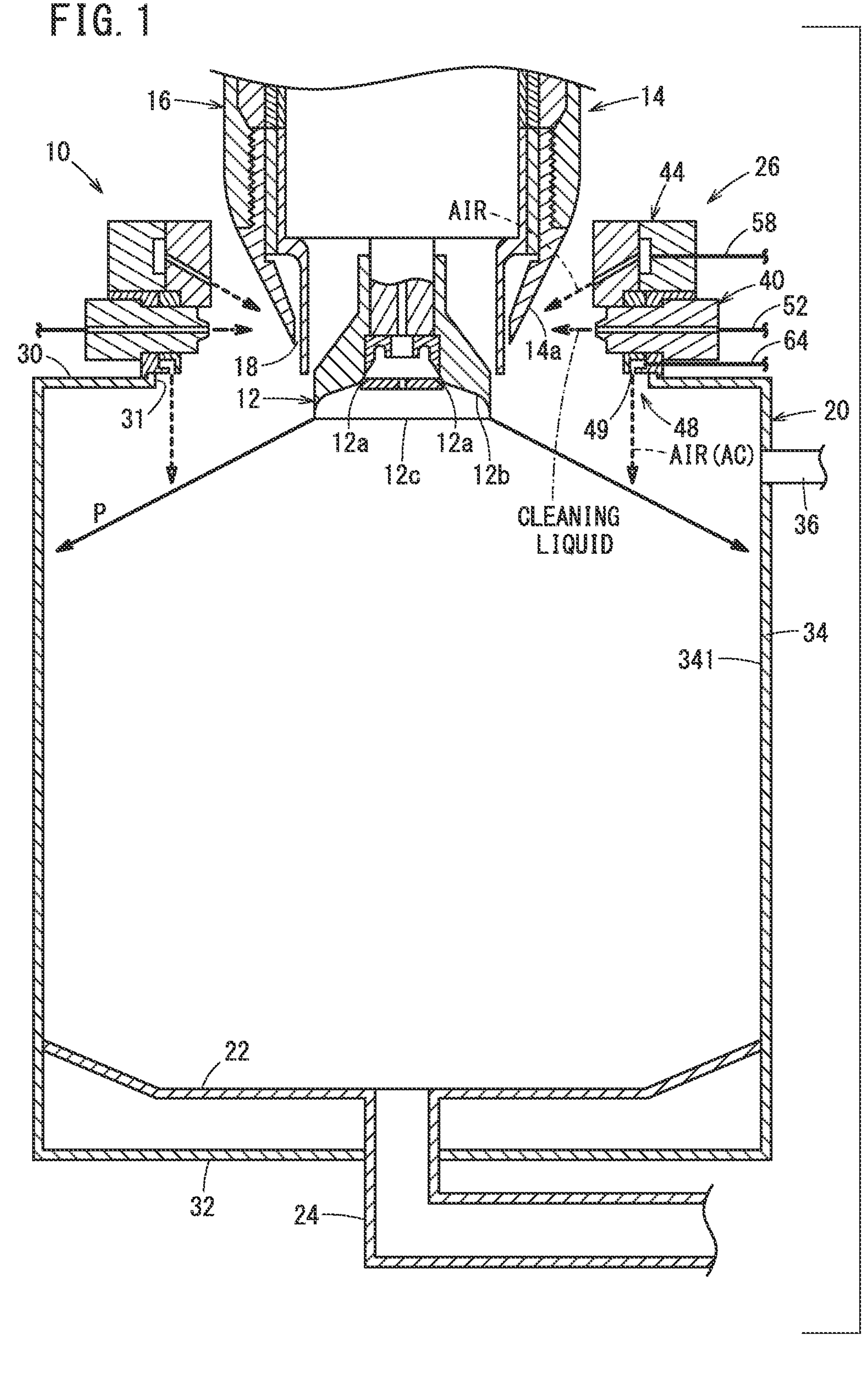
FIG. 1 is an overall schematic diagram of a waste liquid scattering prevention device according to an embodiment of the present invention.

A waste liquid scattering prevention device 10 according to the present embodiment shown in FIG. 1 is a device for preventing waste liquid from scattering when a paint gun (coating material gun) 14 having a bell-type spray head 12 (hereinafter referred to as "bell cup 12") is cleaned. The waste liquid contains paint (coating material) and cleaning liquid such as thinner. The paint gun 14 includes the bell cup 12 and a body barrel portion 16 for rotatably supporting the bell cup 12 and is attached to the tip of, for example, a robot arm (not shown).

The bell cup 12 has a large number of paint supply holes 12*a* arranged on the circumference. A shaping air discharge portion 18 is provided behind the bell cup 12 (opposite to the spray direction). The shaping air discharge portion 18 is an outlet from which a high-speed air flow called shaping air is discharged. At the time of painting, the paint is supplied to an inner surface 12*b* of the bell cup 12 via the large number of paint supply holes 12*a*. The paint supplied to the inner surface 12*b* of the bell cup 12 is carried to a cup tip end edge 12*c* by the centrifugal force generated when the bell cup 12 rotates. The paint is atomized at the cup tip end edge 12*c* and discharged toward a workpiece (not shown) that is a target to be painted.

The waste liquid scattering prevention device 10 includes a box body 20 and a functional unit 26.

In this embodiment, the box body 20 is formed in a cylindrical shape. The outer shape of the box body 20 is not limited to a cylindrical shape, and may be, for example, a truncated cone shape, a rectangular parallelepiped shape, or a truncated pyramid shape. The box body 20 has an upper wall 30 and a side wall 34.

The upper wall 30 is a circular wall connected to the upper end of the side wall 34. The upper wall 30 has an insertion hole 31 for inserting the tip portion of the paint gun 14 (hereinafter also referred to as "gun tip portion 14*a*"). Because the outer shape of the body barrel portion 16 of the paint gun 14 in a cross section perpendicular to the axis of the body barrel portion 16 is circular, the insertion hole 31 is formed in a circular shape. The insertion hole 31 has a diameter through which at least the shaping air discharge portion 18 of the paint gun 14 can pass.

In this embodiment, the side wall 34 is formed in a hollow cylindrical shape. An opening 24 is formed at the lower end of the side wall 34, and the box body 20 is formed in a cylindrical shape opening downward. The waste liquid inside the box body 20 is discharged downward from the opening 24. The opening 24 may be a hole formed in the bottom wall 32 connected to the lower end of the side wall 34, and the waste liquid may be recovered from the opening 24 and the waste liquid containing the cleaning liquid may be reused.

When the waste liquid is recovered and reused from the opening 24, the opening 24 is preferably a hole formed in the bottom wall 32 of the box body 20, and the box body 20 is preferably provided with an exhaust pipe 36 and a waste liquid receiving portion 22. The exhaust pipe 36 is connected to the upper portion of the side wall 34 and discharges out of the box body 20 the shaping air that enters into the box body 20 from the shaping air discharge portion 18 of the paint gun 14 during cleaning. The waste liquid receiving portion 22 is disposed at a lower portion within the box body 20. Specifically, the waste liquid receiving portion 22 is disposed above the bottom wall 32. The waste liquid receiving portion 22 is formed in a concave shape with a central portion being recessed downward with respect to the outer peripheral portion and receives the waste liquid. The opening 24 is connected to the waste liquid receiving portion 22 and discharges the waste liquid present in the waste liquid receiving portion 22. The opening 24 is connected to the lowest region of the waste liquid receiving portion 22 so that the waste liquid in the waste liquid receiving portion 22 can be efficiently delivered.

The functional unit 26 is disposed at an upper portion of the box body 20. Specifically, the functional unit 26 is fixed to the upper wall 30 of the box body 20 and protrudes upward from the upper wall 30. The functional unit 26 is formed in a ring shape along the circular insertion hole 31. When the paint gun 14 is cleaned, the gun tip portion 14*a* is inserted into and disposed in a circular arrangement hole 26*a* that is a hollow portion of the functional unit 26. The functional unit 26 includes a cleaning mechanism 40, an air blowing mechanism 44, and an air ejecting mechanism 48.

Figure 2:
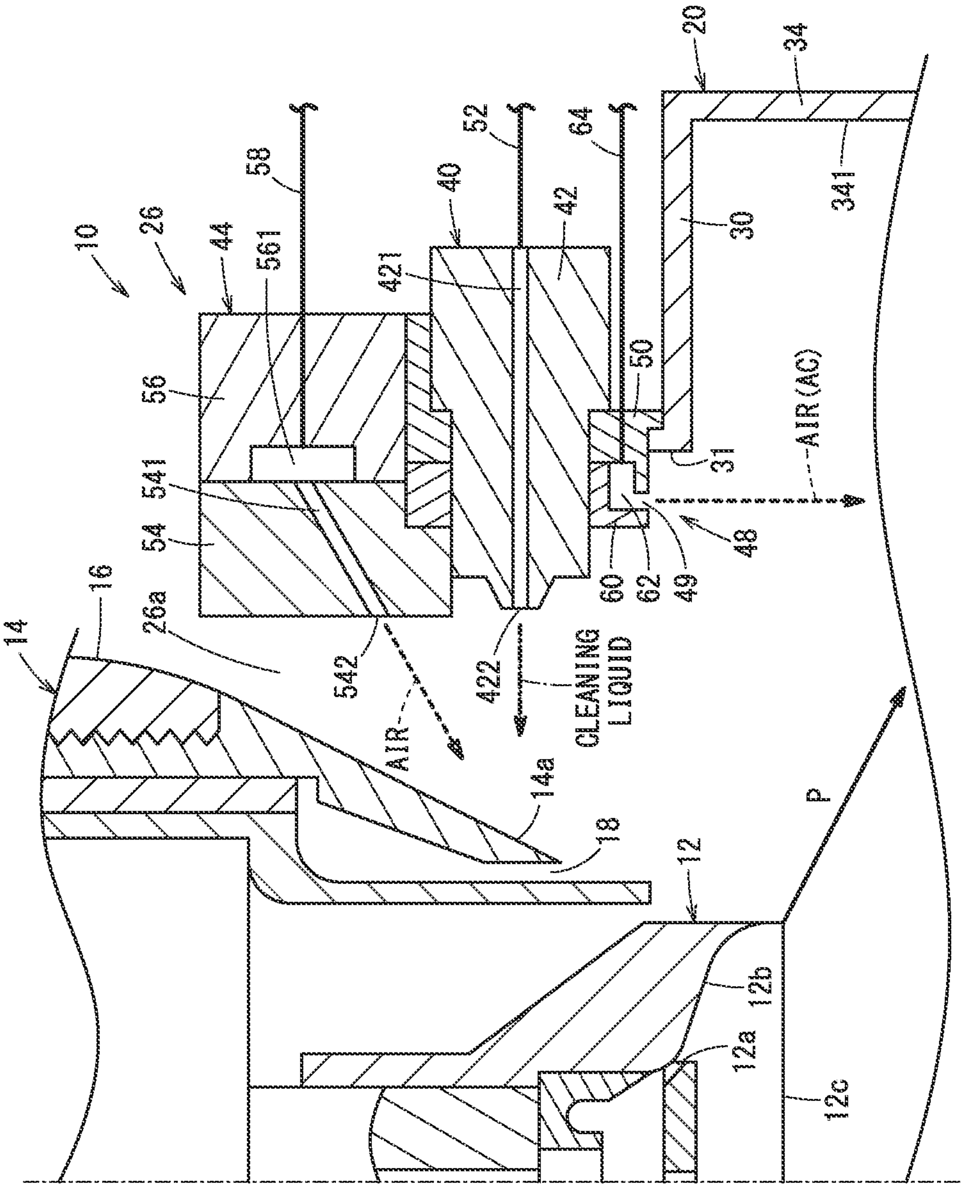
FIG. 2 is an enlarged view of principal components of the waste liquid scattering prevention device according to the embodiment of the present invention.

As shown in FIG. 2, the cleaning mechanism 40 has a plurality of cleaning nozzles 42 spaced from each other in the circumferential direction of the functional unit 26. The plurality of cleaning nozzles 42 are mounted on an annular support member 50 fixed to the inner peripheral portion of the upper wall 30 of the box body 20. The cleaning nozzle 42 has a liquid path 421 through which cleaning liquid flows and a cleaning liquid discharge port 422 through which the cleaning liquid is discharged. The liquid flow path 421 is connected to a cleaning liquid supply line 52. The cleaning liquid discharge port 422 is provided at the tip of the cleaning nozzle 42 oriented toward the center of the arrangement hole 26*a*. The cleaning liquid discharge port 422 discharges (sprays) the cleaning liquid toward the outer peripheral surface of the gun tip portion 14*a*.

The air blowing mechanism 44 is disposed above the cleaning mechanism 40. The air blowing mechanism 44 includes an annular nozzle block 54 having a plurality of air nozzle holes 541, and an annular air supply block 56 surrounding the nozzle block 54. The plurality of air nozzle holes 541 are formed at intervals in the circumferential direction. Each air nozzle hole 541 is inclined downward toward the inner peripheral surface of the nozzle block 54. An inner end of each air nozzle hole 541 is an air discharge port 542 opened on the inner peripheral surface of the nozzle block 54.

The air supply block 56 has an annular air flow path 561. The air flow path 561 is connected to an air supply line 58. Air supplied from the air supply line 58 to the air flow path 561 flows in the air flow path 561 in the circumferential direction and flows into the plurality of air nozzle holes 541. Air is discharged from the air discharge port 542 of the plurality of air nozzle holes 541 toward the arrangement hole 26*a*.

The air ejecting mechanism 48 has an air ejection port 49 that blows air along an inner wall (inner wall 341 of the side wall 34) of the box body 20. The air ejection port 49 is disposed at an upper portion of the box body 20 and ejects air along the inner wall 341 toward a lower portion of the box body 20. The air ejection port 49 opens downward. Specifically, the air ejection port 49 is formed in a slit shape and forms an air curtain AC along the inner wall 341. More specifically, the air ejection port 49 is formed in the shape of an annular slit and forms the annular (hollow cylindrical) air curtain AC along the inner wall 341. The annular slit-shaped air ejection port 49 is formed concentrically with the insertion hole 31. The diameter of the annular shape of the air ejection port 49 is larger than the outer shape of the bell cup 12.

The functional unit 26 has an annular inner ring 60 disposed inside the support member 50. An annular clearance 62 opening downward is formed between the lower portion of the support member 50 and the lower portion of the inner ring 60. A lower end of the clearance 62 constitutes an air ejection port 49. The clearance 62 is connected to an air supply line 64. The air supplied from the air supply line 64 to the clearance 62 is ejected downward from the air ejection port 49. The air ejection port 49 is disposed below the cleaning mechanism 40 (the plurality of cleaning nozzles 42). The air ejection port 49 is disposed radially further outward than the cleaning liquid discharge port 422.

It should be noted that the air ejection port 49 is not limited to the form of an annular slit but may be a plurality of slits arranged at intervals in the circumferential direction. The air ejection port 49 is not limited to a slit shape and may be a plurality of non-slit openings arranged at intervals in the circumferential direction. The air ejection port 49 is not limited a case where the air ejection port 49 is disposed at the upper portion of the box body 20 because it is sufficient if it can eject air along the inner wall 341. Therefore, for example, the air ejection port 49 may be disposed at a lower portion of the box body 20 and may eject air from the lower portion of the box body 20 upward along the inner wall 341. The air ejection port 49 may eject air in a horizontal direction along the inner wall 341.

A waste liquid scattering prevention method using the waste liquid scattering prevention device 10 is performed as explained below.

For example, when a paint color applied on a workpiece is changed or when regular cleaning operations are performed, the paint gun 14 is cleaned. The waste liquid scattering prevention method includes an arrangement step of arranging the paint gun 14 at a predetermined position, a cleaning step of cleaning the paint gun 14, and an air ejecting step of ejecting air from the air ejection port 49.

First, the arrangement step is performed. As shown in FIG. 1, in the arrangement step, the tip portion (gun tip portion 14*a*) of the paint gun 14 is inserted into the insertion hole 31 formed in the upper wall 30 of the box body 20. Specifically, for example, the robot arm are moved, whereby the gun tip portion 14*a* attached to the tip of the robot arm is inserted into the insertion hole 31 via the arrangement hole 26*a* of the functional unit 26. As a result, the gun tip portion 14*a* is disposed on the inner side of the functional unit 26 (the arrangement hole 26*a*). At this time, the plurality of cleaning nozzles 42 and the air discharge ports 542 of the plurality of air nozzle holes 541 face the outer peripheral surface of the gun tip portion 14*a*.

Next, the cleaning step is performed. The cleaning step includes an internal cleaning step for cleaning the internal flow path of the paint gun 14 and an external cleaning step for cleaning the outer peripheral surface of the gun tip portion 14*a*. In the internal cleaning step, the cleaning liquid is supplied to the internal flow path of the paint gun 14 while the bell cup 12 is rotated, and the shaping air is discharged from the shaping air discharge portion 18 to spray the waste liquid. The waste liquid is liquid that contains paint and cleaning liquid remaining in the internal flow path of the paint gun 14. The waste liquid atomized at the cup tip end edge 12*c* by the shaping air forms a spray pattern P expanding downward and is sprayed from the cup tip end edge 12*c*.

The external cleaning step is performed after the internal cleaning step or in parallel with the internal cleaning step. In the external cleaning step, the cleaning liquid is supplied from the cleaning liquid supply line 52 to the liquid flow path 421 of the cleaning nozzle 42, and the cleaning liquid is ejected toward the outer peripheral surface of the gun tip portion 14*a* from the cleaning liquid discharge port 422. Thus, the paint adhered to the outer peripheral surface of the gun tip portion 14*a* is washed away by the cleaning liquid.

During the cleaning step, air is supplied to the plurality of air nozzle holes 541 of the air blowing mechanism 44, and air is discharged from the air discharge port 542 toward the arrangement hole 26*a*. Air is introduced into the internal space of the box body 20 via the arrangement hole 26*a* (specifically, between the inner peripheral portion of the functional unit 26 and the outer peripheral portion of the paint gun 14). Thus, in the internal cleaning step, it is suppressed that the atomized waste liquid moves upward via the insertion hole 31 and the arrangement hole 26*a* and comes out of the waste liquid scattering prevention device 10. In the external cleaning step, upward rebounding of the cleaning liquid that has collided with the outer peripheral surface of the gun tip portion 14*a* is suppressed, and the cleaning liquid is suppressed from coming out of the waste liquid scattering prevention device 10 via the arrangement hole 26*a*. In the external cleaning process, the cleaning liquid adhering to the gun tip portion 14*a* is blown downward by the air discharged from the air blowing mechanism 44.

The air ejecting step is performed during the cleaning step. In the air ejecting step, air is ejected out from the air ejection port 49 along the inner wall 341 of the box body 20. Specifically, air is supplied from the air supply line 64 to the clearance 62, and air is ejected downward from the air ejection port 49. In the present embodiment, since the air ejection port 49 is an annular slit, the annular air curtain AC along the inner wall 341 is formed on the inner side of the box body 20 so as to be concentric with the insertion hole 31. By the air ejected along the inner wall 341 from the air ejection port 49, collision of the atomized waste liquid with the inner wall 341 is suppressed, and rising of the atomized waste liquid is suppressed.

During the cleaning step, the waste liquid is atomized. The waste liquid in the internal cleaning step is a liquid mixture of cleaning liquid and paint. The waste liquid in the external cleaning step is the cleaning liquid spouted from the cleaning nozzle 42. Since the air ejected from the air ejection port 49 functions as a barrier, the air suppresses collision of the atomized waste liquid with the inner wall 341 of the box body 20.

The waste liquid present inside the waste liquid scattering prevention device 10 is discharged from the opening 24 below the box body 20. Further, the waste liquid scattering prevention method may include a discharging step of recovering the waste liquid received at the lower portion of the box body 20. Specifically, the waste liquid generated in the cleaning step is received by the waste liquid receiving portion 22 shown in FIG. 1 and then sent from the waste liquid receiving portion 22 to the outside of the box body 20 through the opening 24 and collected.

The waste liquid scattering prevention device 10 and the waste liquid scattering prevention method provide the following benefits.

The waste liquid scattering prevention device 10 is provided with the air ejection port 49 for discharging air along the inner wall 341 of the box body 20. By the air ejected along the inner wall 341 of the box body 20, collision of the waste liquid atomized in the box body 20 with the inner wall 341 is suppressed, and the rising of the atomized waste liquid is suppressed. Therefore, re-adhesion of the atomized waste liquid to the paint gun 14 can be suppressed.

The air ejection port 49 is disposed at an upper portion of the box body 20 and ejects air along the inner wall 341 toward a lower portion of the box body 20. By ejecting air downward along the inner wall 341 of the box body 20 from the upper part of the box body 20, it is possible to generate a downward air flow inside the box body 20 and to prevent the atomized waste liquid from rising and adhering to the paint gun 14.

Further, air ejected downward along the inner wall 341 of the box body 20 from the air ejection port 49 generates a suction force for drawing the outside air from the outside of the box body 20 through the arrangement hole 26*a* toward the internal space of the box body 20, so that the downward flow of the air discharged from the air blowing mechanism 44 is given impetus. Thus, the rebounding of the cleaning liquid can be more effectively suppressed, and the cleaning liquid adhered to the gun tip portion 14*a* can be more effectively blown downward.

The air ejection port 49 is formed in a slit shape and forms the air curtain AC along the inner wall. By forming the air curtain AC along the inner wall, it is possible to more effectively suppress the rebounding of the atomized waste liquid.

The air ejection port 49 is formed in an annular slit shape and forms the annular air curtain AC along the inner wall 341 of the box body 20. By forming the annular air curtain AC along the inner wall 341 of the box body 20, it is possible to more effectively suppress the rebounding of the atomized waste liquid.

After the paint gun 14 is cleaned, a confirmation operation (so-called test spraying) of spraying the paint from the paint gun 14 may be performed while the gun tip portion 14*a* is in the insertion hole 31. At the time of test spraying, air may be ejected from the air ejection port 49 along the inner wall 341 of the box body 20. The air ejected along the inner wall 341 of the box body 20 suppresses collision of the atomized waste liquid (in this case, atomized paint) with the inner wall 341. As a result, it is possible to suppress re-adhesion of the waste liquid to the paint gun 14 due to the rebounding at the inner wall 341. At the time of test spraying, in addition to the air ejection from the air ejection port 49, air may be discharged from the air blowing mechanism 44.

The above-described embodiments are summarized as follows.

Disclosed is the waste liquid scattering prevention device (10) that prevents the scattering of the waste liquid when the paint gun (14) including the bell-shaped spray head (12) is cleaned or tested, the device including the box body (20) that includes the upper wall (30) being formed with the insertion hole (31) into which the tip portion of the paint gun is inserted, and the air ejection port (49) that ejects air along the inner wall (341) of the box body.

The air ejection port is disposed at the upper portion of the box body and ejects the air along the inner wall toward the lower portion of the box body.

The air ejection port is formed in a slit shape and forms the air curtain (AC) along the inner wall.

The air ejection port is formed in an annular slit shape and forms an annular air curtain along the inner wall. An opening (24) that discharges the waste liquid is provided at the lower end of the box body.

Disclosed is the waste liquid scattering prevention method that prevents scattering of waste liquid when the paint gun (14) including the bell-shaped spray head (12) is cleaned or tested, the method including an arrangement step of inserting the tip portion of the paint gun into the insertion hole (31) formed in the upper wall (30) of the box body (20), a cleaning step of cleaning the paint gun, and an air ejecting step of ejecting air from the air ejection port (49) along the inner wall (341) of the box body.

In the air ejecting step, the air is ejected toward the lower portion of the box body along the inner wall from the air ejection port formed in the upper wall of the box body.

In the air ejecting step, air is ejected from the air ejection port formed in a slit shape to form the air curtain (AC) along the inner wall.

In the air ejecting step, the air is ejected from the air ejection port formed in an annular slit shape to form the annular air curtain along the inner wall.

It should be noted that the present invention is not limited to the above-described embodiment, and various configurations can be adopted without departing from the gist of the present invention.

What is claimed is:

1. A waste liquid scattering prevention device that prevents scattering of waste liquid when a paint gun including a bell-shaped spray head is cleaned or tested, the device comprising:

a box body that includes an upper wall being formed with an insertion hole into which a tip portion of the paint gun is inserted;

a cleaning nozzle that discharges cleaning liquid; and an air ejection port that is positioned lower than the cleaning nozzle, opens downward, and is configured to eject air along an inner wall of the box body.

2. The waste liquid scattering prevention device according to claim 1, wherein the air ejection port is disposed at an upper portion of the box body and ejects the air along the inner wall toward a lower portion of the box body.

3. The waste liquid scattering prevention device according to claim 1, wherein the air ejection port is formed in a slit shape and forms an air curtain along the inner wall.

4. The waste liquid scattering prevention device according to claim 1, wherein the air ejection port is formed in an annular slit shape and forms an annular air curtain along the inner wall.

5. The waste liquid scattering prevention device according to claim 1, wherein an opening that is configured to discharge the waste liquid is provided at a lower end of the box body.

6. A waste liquid scattering prevention method that prevents scattering of waste liquid when a paint gun including a bell-shaped spray head is cleaned or tested, the method comprising:

inserting a tip portion of the paint gun into an insertion hole formed in an upper wall of a box body;

cleaning the paint gun by discharging cleaning liquid from a cleaning nozzle; and ejecting air downward along an inner wall of the box body from an air ejection port positioned lower than the cleaning nozzle.

7. The waste liquid scattering prevention method according to claim 6, wherein in the ejecting, the air is ejected toward a lower portion of the box body along the inner wall from the air ejection port formed in the upper wall of the box body.

8. The waste liquid scattering prevention method according to claim 6, wherein in the ejecting, the air is ejected from the air ejection port formed in a slit shape to form an air curtain along the inner wall.

9. The waste liquid scattering prevention method according to claim 6, wherein in the ejecting, the air is ejected from the air ejection port formed in an annular slit shape to form an annular air curtain along the inner wall.

* * * * *